Jan. 9, 1934.  W. RAILLEY  1,942,834
QUICK DETACHABLE MOUNT FOR MOTORS
Filed July 25, 1933  2 Sheets-Sheet 1
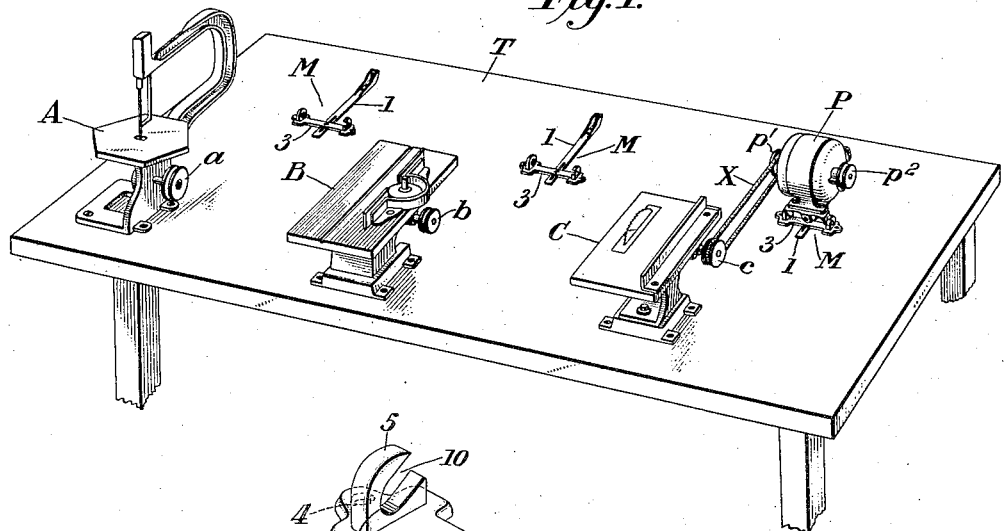
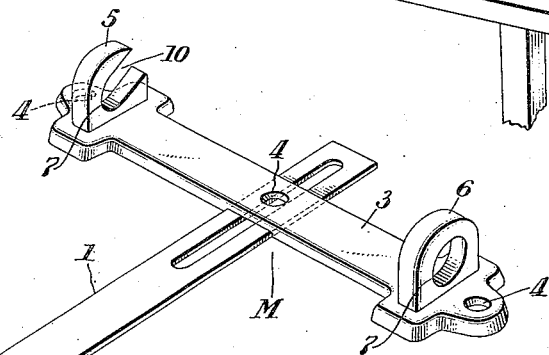
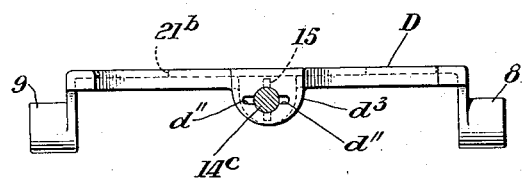
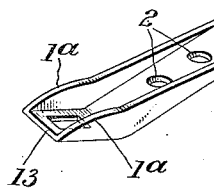
Inventor
William Railley
By Nathan, Bowman & Helferich
Attorneys Jan. 9, 1934. W. RAILLEY 1,942,834
QUICK DETACHABLE MOUNT FOR MOTORS
Filed July 25, 1933 2 Sheets-Sheet 2
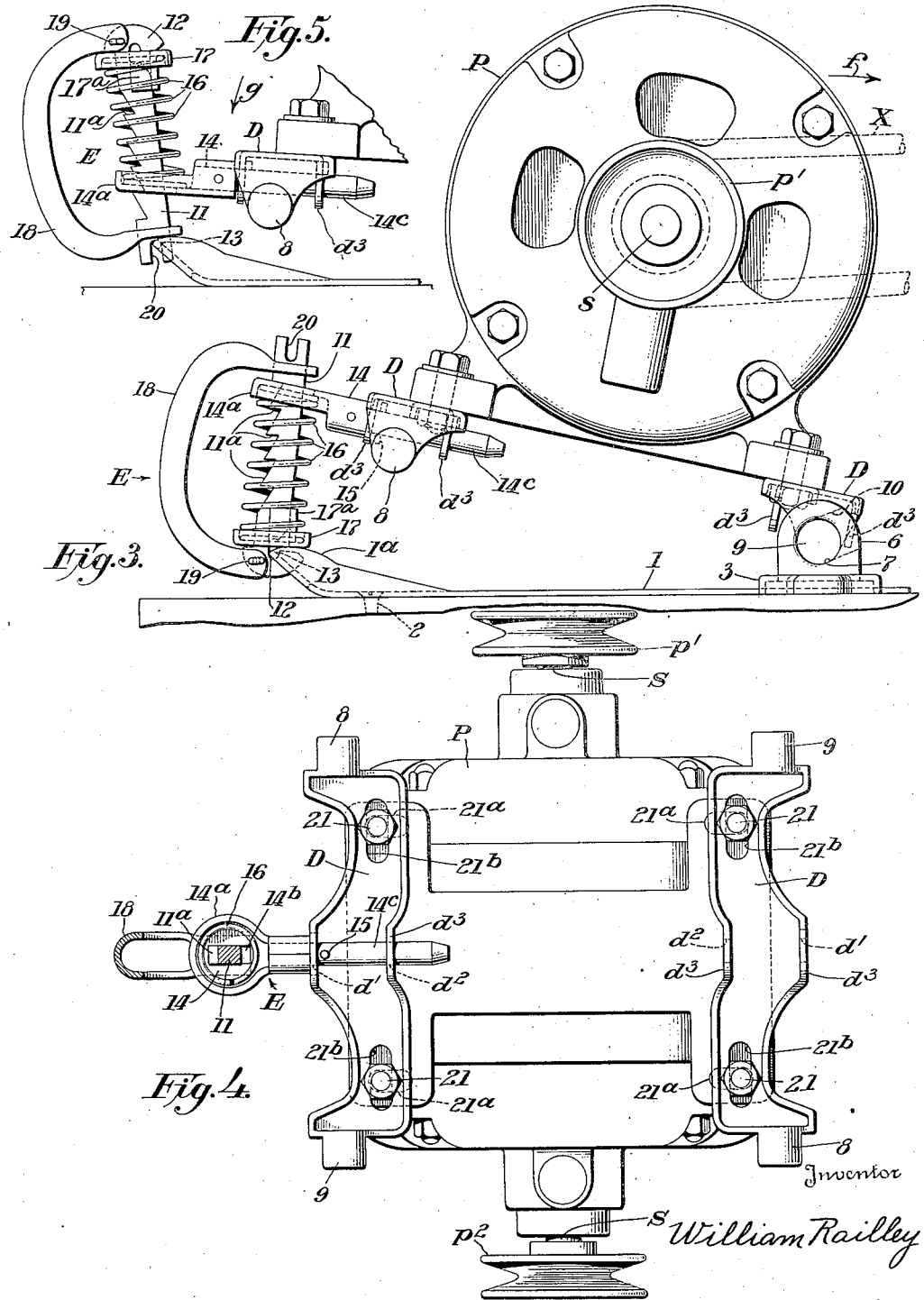
Inventor
William Railley
By Nathan, Bowman & Helfrich
Attorneys Patented Jan. 9, 1934

1,942,834

UNITED STATES PATENT OFFICE 1,942,834

QUICK DETACHABLE MOUNT FOR MOTORS

William Railley, Roselle, N. J.

Application July 25, 1933. Serial No. 682,112

6 Claims. (Cl. 308—11)

This invention relates to an improvement in supports or mounts for prime movers and it has as its primary object to provide simplified means whereby a suitable prime mover readily may be accurately located and suitably supported in any desired position of use and connected directly to the machine which it is adapted to drive.

For the purpose of this disclosure, an electric motor will serve as a good example of a suitable prime mover and certain wood-working machines will serve as illustrating various uses to which the prime mover advantageously may be put. It is to be understood, however, that these examples are for the purpose of illustration only and are not to be taken as limiting this invention to the devices shown. As used herein the term "motor" is intended to mean any suitable prime mover.

More or less recently it has become popular among home owners, and others, to provide themselves with certain woodworking machines, usually of relatively small size, and a number of manufacturers are selling tables equipped with such machines and with power means for driving them.

Heretofore it has been customary to fit the table with a prime mover, usually an electric motor, and a driving connection comprising a system of shafting, bearing brackets, pulleys, belts etc. to drive the various machines from the prime mover. This driving equipment has been complicated and expensive and the moving parts have been a source of constant danger to the user.

For home or amateur use, it is seldom that more than one machine is used at a time yet, as heretofore provided, the shafting for all of the machines was required to be driven whenever any one machine was in use. Such installations have, therefore, been inefficient in that a substantial portion of the power provided has been utilized to rotate the shafting in its supporting bearings, thereby necessitating the provision of a motor of materially greater power than otherwise would be required to operate any given machine. Further power losses have resulted from the slippage of the belts between the prime mover and the main shaft and between the main shaft and the individual machines.

An object of this invention is to provide improved means whereby an electric motor, or other prime mover may be quickly, easily and removably mounted adjacent a machine desired to be driven and connected directly to said machine by a single belt connection.

Another object is so to support the prime mover that the connecting belt may be maintained taut, thereby effecting an efficient drive between the driving and driven elements.

Another object is to provide a plurality of the improved supports for the prime mover and to locate one of said supports adjacent each of a plurality of machines, whereby the prime mover readily may be removably attached to any one of said supports and operatively connected directly with the selected machine. This results in maximum efficiency of operation, inasmuch as all shaft, bearings etc., of prior constructions may be dispensed with. It, therefore, becomes possible to employ a prime mover of less size and strength than heretofore was required to operate the same machines.

A further object of the invention is to provide, on the prime mover, means adapted so to cooperate with the support that the prime mover may be attached thereto in either one of two positions thereby selectively to cause the machine to be driven in either clockwise or counter-clockwise direction.

Still another object is to provide improved means for pivotally attaching the prime mover to its support so that the prime mover readily may be adjusted to take up slack in its power transmitting belt, and to permit a portion thereof to be reversed, depending upon whether the tension of the belt tends to swing the prime mover the one way or the other.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a perspective view of a machine table provided with a plurality of machines and with a like number of my improved supports, one adjacent each machine, showing how a prime mover readily may be attached to any one of said supports and operatively connected to any one of said machines.

Fig. 2 is a perspective view of one of the supports.

Fig. 3 is a side elevation of one of the supports with an electric motor removably attached thereto.

Fig. 4 is a bottom view of the motor showing it provided with two adapter plates, either of which may be fitted to the bearings provided by the supports.

Fig. 5 is a detail view of a belt tensioning connector between the motor support and one of the adapter plates, the position of the connector in this figure being reversed to that shown in Fig. 3.

Fig. 6 is a side elevation of one of the adapter plates showing, in section, a portion of a connector element later to be referred to.

Referring more specifically to the drawings, and first to Fig. 1, my invention is disclosed in combination with a machine table T to which is secured machines A, B and C, here shown as a jig-saw, a jointer, and a circular saw, respectively. These machines are each provided with an actuating shaft, carrying pulleys $a$, $b$ and $c$, respectively, adapted to be driven from any suitable source of power.

Secured to the table T, behind each of the machines A, B and C, is one of my improved motor supports M, each adapted to receive a motor P which, in Fig. 1 is shown as located behind, and operatively connected by driving belt X to machine C. It will be understood that the motor likewise may be attached to either of the other supports M and belted to the machines A or B. Each of the supports is preferably of substantially T-shape and comprises a base bar 1 adapted to be attached to a suitable table or other supporting structure by screws passed through apertures 2 therein, and a cross-head 3 adjustably mounted on the bar 1 and adapted to be secured, in any desired position of adjustment thereon, by screws passed through apertures 4 and threaded into the supporting structure. The adjustment of the cross-head on the base bar adapts the device for use with motors of various size. At its opposite ends, the cross-head 3 is provided with bearing lugs 5 and 6 formed with bearings 7 adapted to receive trunnions 8 and 9, provided by adapter plates D, secured to the underside of the motor at opposite sides of the axis thereof. To facilitate insertion of the trunnions into the bearings the lug 5 is preferably formed with an open slot 10, which communicates with the bearing 7 therein.

It is to be noted that the adapter plates D are similar in construction and that, therefore, the trunnions of either plate selectively may be inserted within the bearings in the lugs 5 and 6 thereby reversing the position of the motor. In one position of the motor the pulley $p^1$, secured to one end of the armature shaft S of the motor, may be connected with the pulley of the selected machine to drive the shaft thereof in one direction. Should it be desired to rotate the shaft in the opposite direction the motor may be reversed on the mount and the pulley $p^2$, on the opposite end of the armature shaft, connected with the pulley of the machine.

From the foregoing, it will be understood that, in operation, the trunnions of one of the adapters D is mounted within the bearings 7 provided by the cross-head 3 and that the motor is free to be adjusted in an arc about the axis of those bearings for the purpose of tightening the driving belt X.

To maintain the motor in the desired position of adjustment there is preferably provided, between the motor and the support M, a reversible connector designated generally as E and shown most clearly in Figs. 3 and 5. This connector comprises a ratchet bar 11 provided at one end with a hook portion 12 adapted, in the position shown in Fig. 3, to engage beneath a cross-bar 13 formed in the upturned rear end of the member 1 of the support. As shown in Fig. 3 the belt X extends in a direction such that the tension thereof tends to swing the motor P in the direction of the arrow $f$. Such movement, however, is prevented by means of a latch member 14 engaging beneath the teeth 11$^a$ of the ratchet bar 11. The latch member is preferably formed with a circular head 14$^a$ provided with a slot 14$^b$ adapted to receive the ratchet bar 11 and a cylindrical end 14$^c$ adapted to be inserted within apertures $d^1$—$d^2$ formed in depending portions $d^3$ of the adapter plates D. To prevent accidental withdrawal of the latch member 14 from the adapter plate the cylindrical portion 14$^c$ carries a cross pin 15 adapted to be inserted through the clearance apertures $d''$ which communicate with the aperture $d'$. A quarter turn of the latch member places the pin 15 behind the solid wall of the portion $d^3$ and prevents its accidental withdrawal.

A coil spring 16 surrounds the ratchet bar 11 between the head 11$^a$ of the latch member and a washer 17 slidably mounted on the ratchet bar and serves to cushion the motor P and to force the latch member into engagement with the teeth of the ratchet bar 11. The washer 17 is adapted to engage the upper curved surfaces 1$^a$ of the member 1 and to rock thereon during adjustment of the motor. The washer is provided with a projecting portion 17$^a$, substantially U-shaped in cross-section, which portion slidably engages the ratchet bar, thereby facilitating sliding of the washer on the bar and preventing tilting thereof on the bar as the hook portion 12 is engaged beneath the cross-bar 13. A substantially C-shaped handle 18 is fixed at one end to one end of the ratchet bar 11 by a pin 19 and has its other end slotted to receive the opposite end of the bar 11. The end of the ratchet bar opposite to that comprising the hook portion 12 is bifurcated, as shown at 20, and, is adapted to straddle and bear upon the cross bar 13 of the member 1 when the connector E is inverted, as shown in Fig. 5. The connector is used in this position when the lead of the belt is in such direction that the tension thereof tends to swing the motor in the direction indicated by the arrow $g$.

It is to be noted that the adapter plates D are adjustably mounted on the motor P by means of bolts 21 passed through transverse slots 21$^a$ and 21$^b$ formed in the feet of the motor and in the adapter plates, respectively. Also that the cross-head 3 of the motor support is adjustable lengthwise of the stem or bar 1. This provides sufficient adjustment to enable the motor to be shifted slightly on its support and also to permit various sizes of motors to be mounted thereon.

From the foregoing description it will be perceived that I have provided an improved mount for motors which may be secured in any desired location and to which a motor quickly and easily may be removably secured in either of two positions dependent upon which direction it is desired to have the motor shaft rotate with respect to the machine to be driven. Likewise the improved mount affords means for maintaining the driving belt taut irrespective of whether the lead of the belt is such as to tend to swing the motor one way or the other about its supporting pivot.

Having thus described my invention what I claim and desire to secure by Letters Patent of the United States, is:—

1. A mount for a motor comprising a substantially T-shaped supporting element consisting of a base bar adapted to be secured to a supporting structure and a cross-head adjustably mounted on the base bar and adjacent one end thereof; bearings provided by said cross-head; an adapter plate adapted to be secured to one side of a motor and provided with oppositely projecting trunnions adapted to be fitted to said bearings thereby to pivotally mount said adapter plate in said bearings, and latch mechanism adapted to be carried by the opposite side of a motor and adapted to engage the opposite end of said base bar to maintain said adapter plate and the motor to which it is secured in various positions of angular adjustment in said bearings.

2. A mount for a motor comprising a substantially T-shaped supporting element consisting of a base bar adapted to be secured to a supporting structure and a cross-head secured to one end of said base bar; spaced bearing lugs provided by said cross head; an open bearing in one of said lugs; a closed bearing in another of said lugs; an adapter plate adapted to be secured to a motor at one side of the axis thereof; trunnions projecting from said adapter plate and adapted to be fitted into said bearings thereby to pivotally mount said adapter plate on said cross head; spring means engaging said supporting element and normally tending to swing said adapter plate about the axis of said bearings; and latch mechanism comprising a ratchet bar connected to said supporting element and a cooperating latch member adapted to be connected with the adapter plate and acting in opposition to said spring means to maintain said adapter plate in various positions of angular adjustment.

3. A mount for a motor comprising a supporting element provided at one end with spaced bearings and at its opposite end with an upturned portion; a pair of adapter plates adapted to be secured to the underside of a motor, each of said adapter plates being provided with a pair of oppositely projecting trunnions adapted selectively to be inserted within said bearings and intermediate depending portions provided with aligned apertures; and a connector between one of said adapter plates and said supporting element and adapted yieldingly to support a motor and to prevent angular movement thereof by the tension of a belt connected thereto, said connector comprising a ratchet bar operatively connected with the upturned end of said supporting element; a latch member fitted to the aligned apertures in one of said adapter plates and having a head portion slidably mounted on said ratchet bar and adapted to engage the teeth thereof; and a coil spring surrounding said ratchet bar and interposed between said latch member and said supporting element.

4. A mount for a motor comprising a supporting element provided at one end with a pair of bearings; a motor supported on said mount; a pair of trunnions carried by said motor at one side of the axis thereof and adapted to be removably inserted within said bearings, thereby to pivotally mount the motor on said supporting element; a reversible connector attached to said motor at the opposite side of said axis and adapted to engage a portion of said supporting element to prevent swinging of the motor under the influence of a belt connected therewith; said connector including a latch member secured to said motor and a cooperating ratchet bar formed at one end with a hook portion adapted to engage beneath a portion of said supporting element when the pull on the motor is in one direction and a bifurcated end adapted to bear upon said portion when the pull on the motor is in the opposite direction.

5. A mount for a motor comprising a substantially T-shaped supporting element provided at one end with a pair of bearings; a motor; a pair of trunnions carried by said motor at one side of the axis thereof and adapted to be removably inserted within said bearings, thereby to pivotally mount said motor on said supporting element; a detachable and reversible connector attached to the motor at the opposite side of said axis and adapted to engage a portion of said supporting element to prevent swinging of the motor under the influence of a belt connected therewith, said connector comprising a latch member having a detachable connection with said motor, a ratchet bar adapted to detachably engage said supporting element and having teeth engaged by said latch member, a washer on said ratchet bar adapted to engage a portion of said supporting member; a coil spring surrounding said ratchet bar and located intermediate said latch member and said washer; and a handle member engaging the opposite ends of said ratchet bar and serving to bodily remove said connector from said motor and from said supporting element.

6. A mount for a motor comprising a substantially T-shaped supporting member consisting of a base bar and a transversely arranged cross-head adjustable relative to said base bar and having bearings at its opposite ends; a motor support comprising a pair of similar adapter plates adapted to be secured to the underside of a motor at opposite sides of the axis thereof and having transverse adjustments thereon, each of said adapter plates having a pair of trunnions adapted selectively to be inserted in said bearings thereby pivotally to mount said motor support on said supporting member in either of two positions, each of said adapter plates also being provided with a pair of aligned apertures; and a unitary connector element having one portion removably inserted within the apertures in one of said adapter plates and another portion engaging a portion of said base bar thereby to maintain said motor support in various positions of angular adjustment.

WILLIAM RAILLEY.